Patented July 29, 1924.

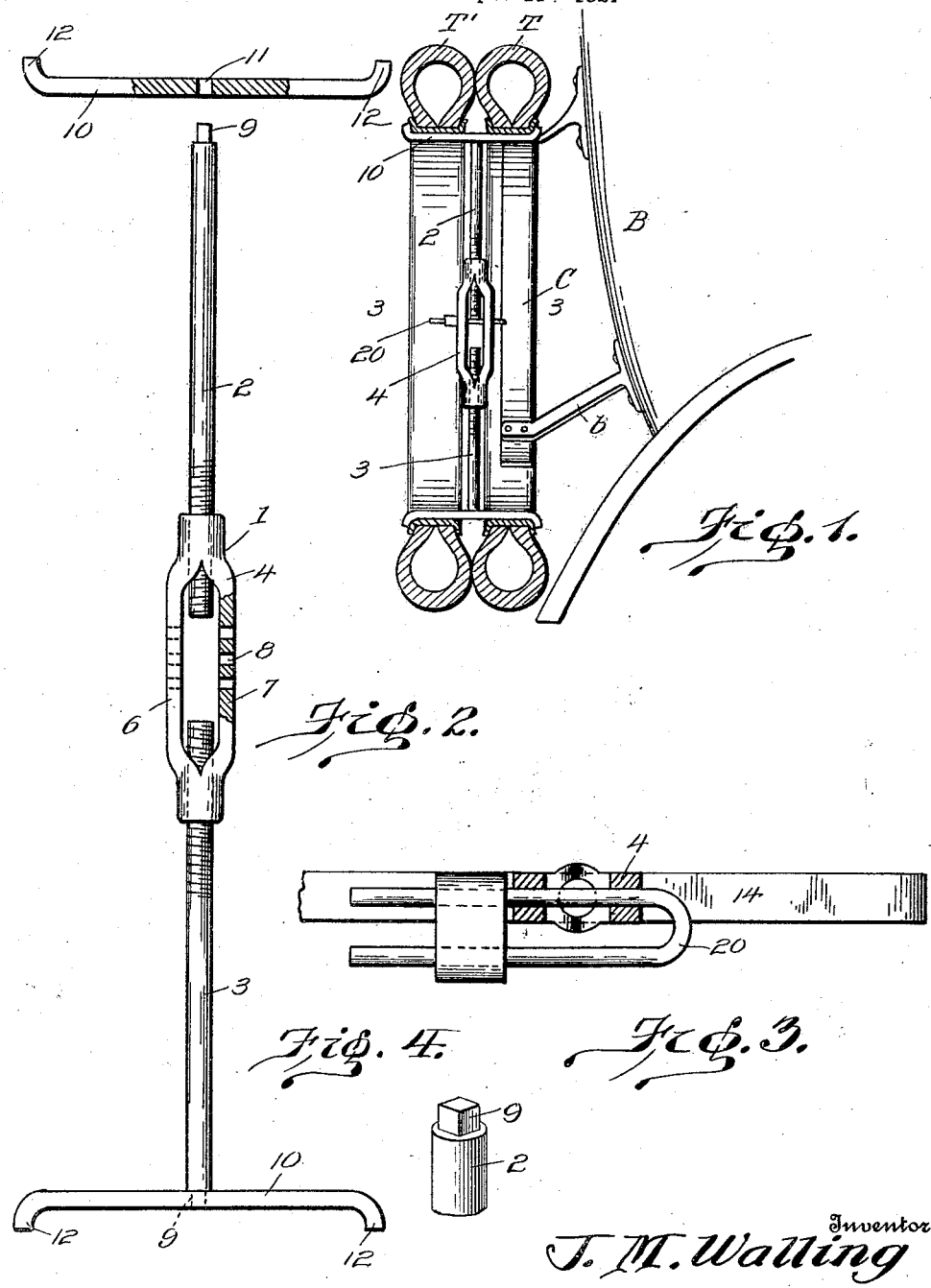

1,502,703

UNITED STATES PATENT OFFICE.

JOSEPH M. WALLING, OF HOUSTON, TEXAS.

AUXILIARY TIRE CARRIER.

Application filed September 13, 1921. Serial No. 500,320.

*To all whom it may concern:*

Be it known that I, JOSEPH M. WALLING, a citizen of the United States, residing at Houston, in the county of Harris and State of Texas, have invented certain new and useful Improvements in Auxiliary Tire Carriers, of which the following is a specification.

This invention relates to tire carriers for automobiles.

One object of the invention is to provide a carrier of this character constructed to be used in connection with and attached to the carrier ordinarily mounted on a car so that two tires may be carried instead of one.

Another object is to provide a removable extra carrier which may be quickly applied to or removed from the fixed carrier and which is adjustable to fit carriers of different sizes.

Another object is to construct such a carrier of a minimum number of parts assembled so as to be strong and durable and which are cheap to manufacture and cannot be removed unless unlocked.

With these and other objects in view, the invention consists in certain novel features of construction as hereinafter shown, described and claimed.

In the accompanying drawing:—

Figure 1 represents a transverse vertical section of two extra tires and the carrier fixed to the car with the auxiliary carrier constituting this invention shown in side elevation applied.

Figure 2 is a side elevation of the carrier constituting this invention with parts broken out and in section and with one of the tire engaging members removed and shown in juxtaposition ready for assembling.

Figure 3 is an enlarged detail section taken on the line 3—3 of Fig. 1, and

Figure 4 is a detail perspective view of one end of one of the rods constituting a part of this invention.

In the embodiment illustrated the rear portion of an automobile body B is shown in Fig. 1 on which is fixedly mounted by brackets $b$ the usual tire carrier C with a tire T shown mounted thereon.

The auxiliary tire carrier constituting this invention comprises two rods 2 and 3 adapted to be arranged in longitudinal alignment with their adjacent ends threaded one of said ends having a right-hand thread and the other a left hand thread and connected by a turn buckle 4 so that when said buckle is turned in one direction the rods will be moved toward each other and when turned in the oppostie direction they will be moved away from each other for a purpose presently to be described. The opposed side walls 6 and 7 of the buckle 4 are provided each with a series of apertures 8 those in one side wall registering with those in the other and which are designed to receive the shackle of a lock 20.

The adjustable rods 2 and 3 are each provided at their outer ends with reduced extensions 9 made angular in cross section and adapted to fit in correspondingly shaped apertures 11 of the tire engaging members 10. It is of course understood that there are two of these members 10 one carried at each end of the device and which are of a length sufficient to span two tires T and T' arranged side by side as shown in Fig. 1 the tire T being carried by the carrier C. These members 10 are each composed of a bar having outturned laterally extending ends or fingers 12 adapted to engage the inner edge of the rim of the tire carried by the carrier C and the outer edge of the rim of the tire T' so that the tire T' will be securely held engaged with the tire T against lateral movement.

In the use of this auxiliary tire carrier the members 10 having been engaged as shown in Fig. 1 the turn buckle 4 is rotated in a direction to move the rods 2 and 3 away from each other whereby clamping members 10 are forcibly engaged with the rims of the extra tires and when the rods have been properly adjusted the lock shackle 20 is inserted through one pair of registering apertures 8 into the turn buckle in position to prevent the buckle from being turned in a direction to release the members 10 thereby preventing all possiblity of the tire T from being stolen.

From the above description it will be obvious that the extra tire carrier 1 is composed of five parts only which are strong and durable in construction and may be quickly assembled for use and when not in use may be taken apart and stored in a small space adapting it to be carried in the tool box of a car.

The angular formation of the extensions or studs 9 at the outer ends of the rods 2 and 3 and of the apertures 11 in the members 10 prevents all possibility of the rods being turned in said members thereby increasing the safety of the device.

It will be obvious that this device is comparatively light and may be used or not at the will of the owner according to whether he wishes to carry one spare tire or two.

The preferred embodiment of the invention is disclosed in the drawing and set forth in the specification, but it will be understood that any modifications within the scope of the claimed invention may be made in the construction without departing from the principle of the invention or sacrificing any of its advantages.

I claim:—

1. A tire carrier comprising a pair of oppositely extending tire engaging members each of a length to span transversely the inner faces of the rims of a pair of opposed tires and having out-turned terminal portions overlapping the opposed rims for connecting them to a fixed support in opposed relation, each of said members provided centrally with a polygonal-shaped opening, a pair of spaced lengthwise aligning oppositely movable rods for clamping said members against the rims, each of said rods having a reduced polygonal-shaped outer terminal portion engaging in one of said openings and further having its inner terminal portion peripherally threaded, a revolvable shifting element for and common to said rods for synchronously shifting them, said element having its ends mounted on and threadedly engaging with the threaded terminal portions of the rods, thereby providing for the shifting of the rods when said element is revolved.

2. A tire carrier comprising a pair of oppositely extending tire engaging members each of a length to span transversely the inner faces of the rims of a pair of opposed tires and having out-turned terminal portions overlapping the opposed rims for connecting them to a fixed support in opposed relation, each of said members provided centrally with a polygonal-shaped opening, a pair of spaced lengthwise aligning oppositely movable rods for clamping said members against the rims, each of said rods having a reduced polygonal-shaped outer terminal portion engaging in one of said openings and further having its inner terminal portion peripherally threaded, a revolvable shifting element for and common to said rods for synchronously shifting them, said element having its ends mounted on and threadedly engaging with the threaded terminal portions of the rods, thereby providing for the shifting of the rods when said element is revolved, and said element further provided intermediate its ends with a series of openings for adjustably receiving a locking device to prevent the turning of said element relative to said rods.

In testimony whereof, I affix my signature hereto.

JOSEPH M. WALLING.